(12) United States Patent
Inbe et al.

(10) Patent No.: US 7,371,272 B2
(45) Date of Patent: May 13, 2008

(54) MODIFIER FOR HYDROPHILICITY, HYDROPHILIC MODIFICATION METHOD AND ALUMINUM MATERIAL OR ALUMINUM ALLOY MATERIAL MODIFIED HYDROPHILIC THEREBY

(75) Inventors: Toshio Inbe, Yokohama (JP); Susumu Maekawa, Yokohama (JP); Akira Ushio, Hatogaya (JP); Koichi Saito, Tokyo (JP)

(73) Assignee: Nippon Paint Co., Ltd., Osaka (JP)

( * ) Notice: Subject to any disclaimer, the term of this patent is extended or adjusted under 35 U.S.C. 154(b) by 233 days.

(21) Appl. No.: 10/105,159

(22) Filed: Mar. 26, 2002

(65) Prior Publication Data

US 2003/0039849 A1 Feb. 27, 2003

(30) Foreign Application Priority Data

Mar. 27, 2001 (JP) ............................. 2001-091048

(51) Int. Cl.
*C09K 3/18* (2006.01)
*C23C 22/00* (2006.01)
*C23C 22/54* (2006.01)

(52) U.S. Cl. ............................. 106/14.41; 106/14.05; 106/14.44; 148/240; 148/283; 148/274

(58) Field of Classification Search ............... 148/251, 148/275, 240, 274, 283; 252/383, 384; 106/14.05, 106/14.12, 14.13, 14.41, 14.44; 525/57–58
See application file for complete search history.

(56) References Cited

U.S. PATENT DOCUMENTS

| 3,052,652 | A | * | 9/1962 | Halpern et al. | 525/56 |
| 5,478,884 | A | * | 12/1995 | Tomita et al. | 525/58 |
| 5,538,078 | A | * | 7/1996 | Mizuno et al. | 165/133 |
| 5,804,611 | A | * | 9/1998 | Takoh et al. | 523/122 |

FOREIGN PATENT DOCUMENTS

| EP | 0 978 538 A1 | 2/2000 |
| JP | 5-202313 | 8/1993 |
| JP | 5-214273 | 8/1993 |
| JP | 5-302042 | 11/1993 |
| JP | 7-323500 | 12/1995 |
| JP | 9-14889 | 1/1997 |
| JP | 9-87576 | 3/1997 |
| JP | 2649297 | 5/1997 |
| JP | 10-30069 | 2/1998 |
| JP | 11-131254 | 5/1999 |
| JP | 2000-262968 | 9/2000 |
| JP | 262968 | 9/2000 |

OTHER PUBLICATIONS

English Language Translation of JP 2000262968 A, Yoshikazu et al., Sep. 2000.*

* cited by examiner

*Primary Examiner*—Roy King
*Assistant Examiner*—Lois Zheng
(74) *Attorney, Agent, or Firm*—Sughrue Mion, PLLC

(57) ABSTRACT

A modifier for hydrophilicity and a hydrophilic modification method capable of suppressing not only the odor of the resulting hydrophilic coat itself, but also the unpleasant odor emanation after exposure to odorants and retaining the hydrophilicity even during a long period of use. The modifier for hydrophilicity includes a modified polyvinyl alcohol containing a group represented by formula (I) on a side chain thereof. In the formula, n represents an integer of 1 to 500, $R^1$ represents a hydrogen atom or an alkyl group containing 1 to 4 carbon atoms, and $R^2$ represents a hydrogen atom or a methyl group. The group represented by formula (I) accounts for 0.1 to 10 mole percent of the sum of hydroxyl groups and acetoxy groups in the modified polyvinyl alcohol, and the modified polyvinyl alcohol accounts for 0.1 to 30% by mass relative to the modifier for hydrophilicity

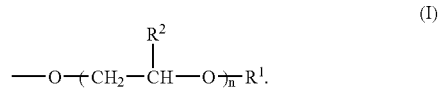

14 Claims, No Drawings MODIFIER FOR HYDROPHILICITY, HYDROPHILIC MODIFICATION METHOD AND ALUMINUM MATERIAL OR ALUMINUM ALLOY MATERIAL MODIFIED HYDROPHILIC THEREBY

BACKGROUND OF THE INVENTION

The present invention relates to a modifier for hydrophilicity and a hydrophilicity modification method capable of providing good hydrophilic and odor preventing ability even during a long period of use, and more particularly, to a modifier for hydrophilicity and a hydrophilic modification method used suitably for evaporators and heat exchangers.

PRIOR ART

Evaporators and heat exchangers generally have a complicated structure, namely they have aluminum fins arranged therein at short intervals for heat exchange and further have aluminum tubes intricately arranged for feeding a cooling medium to these fins. Therefore, the discharge of water condensed upon cooling operation is facilitated by modifying the surface of aluminum fins hydrophilic. However, the above surface of aluminum fins which are modified hydrophilic or the like is exposed to severe conditions, namely to repeated heating and cooling and mixed adhesion of condensed water and dust and microorganisms in the atmosphere. Therefore, it is difficult for that surface to retain hydrophilicity over a long period of time.

Japanese Kokai Publication Hei-05-302042 discloses modifiers for hydrophilicity comprising polyvinyl alcohol (PVA), polyvinylpyrrolidone (PVP), nylon, phenolic resin, etc. Japanese Kokai Publication Hei-05-202313, Japanese Kokai Publication Hei-05-214273, JP 2649297 and Japanese Kokai Publication Hei-10-30069 disclose modifiers for hydrophilicity comprising water-dispersible organic resins and silica or alumina. Furthermore, Japanese Kokai Publication Hei-09-087576 discloses compositions for hydrophilic modification comprising minute hydrophilic crosslinked acrylic polymer particles.

Japanese Kokai Publication Hei-07-323500, Japanese Kokai Publication Hei-09-14889 and Japanese Kokai Publication Hei-11-131254 disclose modifiers for hydrophilicity intended for retaining hydrophilicity by crosslinking such polar functional groups as sulfonic acid groups and acrylamide for insolubilization.

Japanese Kokai Publication 2000-262968 discloses a coat for aluminum fins which comprises PVA having a degree of saponification of not less than 90% and a metal salt and are intended for suppressing odor emanation and deterioration in hydrophilicity.

SUMMARY OF THE INVENTION

The present invention has for its object to provide a modifier for hydrophilicity and a hydrophilic modification method which are capable of suppressing not only the odor of the resulting hydrophilic coat itself but also the unpleasant odor emanation after exposure to odorants and retaining the hydrophilicity even during a long period of use. A further object is to provide an aluminum material or aluminum alloy material treated by said hydrophilic modification method, which is used suitably for heat exchangers and the like.

The present inventors found that when substrate materials made of aluminum or an aluminum alloy, after treatment for rust prevention, are treated with a modifier for hydrophilicity which comprises a modified polyvinyl alcohol containing a group obtainable by addition of 1 to 500 mole ethylene oxide on a side chain thereof within a specific range of amount, thus coated substrate materials with a hydrophilic coat can suppress possible odor emanation from the substrate materials and from the above hydrophilic coat itself even during a long period of use and, even after exposure to an odorant, such as tobacco, sweat or perfume, can suppress emanation of the unpleasant odor of such odorant and, furthermore, can retain a sufficient hydrophilicity. The present invention has been completed on the basis of such findings.

The present invention thus provides a modifier for hydrophilicity which comprises a modified polyvinyl alcohol containing a group represented by the formula (I) on a side chain thereof;

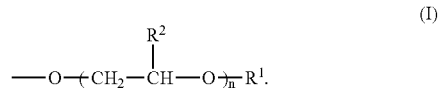

in the formula, n represents an integer of 1 to 500, $R^1$ represents a hydrogen atom or an alkyl group containing 1 to 4 carbon atoms, and $R^2$ represents a hydrogen atom or a methyl group, said group represented by the above formula (I) accounting for 0.01 to 20 mole percent of the sum of hydroxyl groups and acetoxy groups in said modified polyvinyl alcohol, and said modified polyvinyl alcohol accounting for 0.1 to 30% by mass relative to said modifier for hydrophilicity.

Said modifier for hydrophilicity may comprise a polyvinyl alcohol not containing any group represented by the formula (I) in an amount of 0.1 to 30% by mass relative to said modifier for hydrophilicity.

Preferably, the above modifier for hydrophilicity further comprises at least one member selected from the group consisting of phosphorus compound salts and boron compound salts of Ca, Al, Mg, Fe and Zn in an amount of 0.1 to 200% by mass relative to a resin solid matter.

Preferably, the above modifier for hydrophilicity further comprises at least one member selected form the group consisting of inorganic crosslinking agents, organic crosslinking agents and coupling agents and may comprise less than 50% by mass, relative to the resin solid matter, of particles having a mean particle diameter of 0.01 to 5 μm.

Preferably, the above modifier for hydrophilicity comprises less than 50% by mass, relative to the resin solid matter, of a hydrophilic organic compound having at least one member selected from the group consisting of hydroxyl, carboxyl, sulfo, amido, amino, phosphonic and nitrile groups and an ether bond. Preferably, the above hydrophilic organic compound has a polyoxyethylene chain.

The invention also provides a hydrophilic modification method which comprises a step of, after treatment for rust prevention of a substrate material made of aluminum or an aluminum alloy, forming a coat having a solid coat amount of 0.02 to 3 g/m² on the substrate with said modifier for hydrophilicity.

The present invention further provides an aluminum or aluminum alloy material treated by the above hydrophilic modification method.

DETAILED DESCRIPTION OF THE INVENTION

In the following, the present invention is described in detail.

The modifier for hydrophilicity of the invention comprises a modified polyvinyl alcohol containing a group represented by the above formula (I) on a side chain thereof. The above-mentioned modified polyvinyl alcohol has good hydrophilicity and water resistance, has itself no odor and hardly allows adsorption of odorants thereon, so that the modifier for hydrophilicity of the invention which comprises the above modified polyvinyl alcohol is excellent in hydrophilicity and odor preventing ability. The hydrophilic coat obtained therefrom will hardly deteriorate even upon exposure to water drops or to running water and, therefore, the inorganic substances, such as silica, or other residual monomer components which are optionally contained and emanate their own dusty odor and/or the unpleasant odors of substances adsorbed thereon are hardly exposed and, further, the materials treated, such as aluminum, are hardly exposed, so that the treated materials themselves can be prevented from being scattered to emanate dusty odors or being corroded.

In the above formula (I), n is an integer of 1 to 500. When it exceeds 500, the hydrophilicity becomes excessive, making the film-forming ability poor and facilitating the adsorption of odorants. Preferably, n is an integer of 1 to 100, more preferably an integer of 1 to 30. $R^1$ in the above formula (I) represents a hydrogen atom or an alkyl group containing 1 to 4 carbon atoms. The above alkyl group containing 1 to 4 carbon atoms is not particularly restricted but may be methyl, ethyl, n-propyl, i-propyl, n-butyl, i-butyl or tert-butyl group. $R^2$ in the above formula (I) represents a hydrogen atom or a methyl group. The above $R^1$ and $R^2$ may be the same or different. Thus, for example, each may be a hydrogen atom to give an oxyethylene chain, or the above $R^1$ may be a hydrogen atom and the above $R^2$ may be a methyl group to form an oxy-1-methylethylene chain.

The above-mentioned modified polyvinyl alcohol has hydroxyl groups and ester bonds as side chains in addition to the group represented by the above formula (I). The above ester bonds are not particularly restricted but may be alkyl ester bonds, for instance. The above ester bonds are generally of the acetate type, namely acetoxy groups are bound, as side chains, to the main chain. The above hydroxyl groups are generally free ones and may form a salt with a metal such as sodium.

In the above-mentioned modified polyvinyl alcohol, the group represented by the above formula (I) accounts for 0.01 to 20 mole percent relative to the above-mentioned hydroxyl and acetoxy groups. When it is less than 0.01 mole percent, the improvement in hydrophilicity and odor preventing ability as resulting from the introduction of the group represented by the above formula (I) is not expressed. When it exceeds 20 mole percent, an excessively high level of hydrophilicity results, deteriorating the film-forming ability and facilitating the adsorption of odorants. Preferably, it is 0.1 to 10 mole percent. The group represented by the above formula (I) may be bound directly to the main chain or via another group, for example an alkylene group such as a methylene or ethylene group, a carbonyl group, an ester group or an amide group.

On the above-mentioned modified polyvinyl alcohol, the above hydroxyl group preferably accounts for 50 to 99.9 mole percent relative to the above hydroxyl and acetoxy groups. When it is less than 50 mole percent, an insufficient level of hydrophilicity and/or a poor odor preventing ability may result. When it exceeds 99.9 mole percent, it may become difficult, from the production process view point, to obtain the above polymer.

As regards the mole percentage relative to hydroxyl and acetoxy groups in the above modified polyvinyl alcohol, it is to be noted that the hydroxyl groups and acetoxy groups do not include those groups contained in the side chains containing the group represented by the above formula (I).

Generally, the above-mentioned modified polyvinyl alcohol can be obtained by saponification of a copolymer produced from monomer components comprising a monomer containing the group represented by the above formula (I) and a vinyl ester-containing monomer.

The degree of saponification of the above-mentioned modified polyvinyl alcohol is preferably not less than 90%, more preferably not less than 95%. When it is less than 90%, poor hydrophilicity may result.

The above monomer containing the group represented by the formula (I) is not particularly restricted but may be any of those having both an unsaturated double bond and a group represented by the above formula (I), for example a product obtained by adding an ethylene oxide to a vinyl group-containing compound such as vinyl alcohol, allyl alcohol, 2-buten-1-ol, 2-buten-2-ol or acrolein. They may be used alone or in combination. The above method of addition is not particularly restricted but, for example, any conventional method can be used. In cases where ethylene oxide is added to a vinyl group-containing aldehyde or ketone, such as acrolein, the corresponding acetal containing two groups represented by the above formula (I) bound to one carbon atom is obtained. Saponification product derived from copolymers obtained from monomer components comprising such an acetal also fall within the scope of the modified polyvinyl alcohol to be used in accordance with the present invention.

The above vinyl ester-containing monomer is not particularly restricted. Generally, however, vinyl acetate is suitably used and it may be used in combination with another vinyl ester-containing monomer.

The methods of copolymerization and saponification for obtaining the above-mentioned modified polyvinyl alcohol are not particularly restricted but any conventional method can be used.

The group represented by the above formula (I) may also be introduced after polymer formation.

The above-mentioned modified polyvinyl alcohol may have the other polyoxyalkylene group in addition to the group represented by the above formula (I). In the above-mentioned modified polyvinyl alcohol, the other polyoxyalkylene group as mentioned above preferably accounts for not more than 30 mole percent relative to the group represented by the above formula (I). When it exceeds 30 mole percent, the odor preventing ability and hydrophilicity may become inferior. The above-mentioned other polyoxyalkylene group can be introduced, for example by using a monomer containing the above-mentioned other polyoxyalkylene group and a vinyl group as a part of the above monomer components followed by copolymerization. The above other polyoxyalkylene group is not particularly restricted but may be a polyoxypropylene group, for instance.

The above-mentioned modified polyvinyl alcohol may have another functional group on a side chain thereof, in addition to the group represented by the above formula (I), hydroxyl groups, ester bonds and the other polyoxyalkylene group which is contained where necessary. The functional group includes, for example, hydrophilic functional groups, for example an ionic groups such as carboxyl, sulfonic and phosphonic groups; cationic groups such as amino group and imidazole ring; and nonionic groups such as epoxy group and ether bond. These other functional groups may be introduced directly as side chains by polymerization of a functional group-containing monomer or may be introduced by modification after polymer formation. The above modification is not particularly restricted but includes, for example, epoxy modification, silyl modification, thiol modification, carbonyl modification and, further, an ionic modifications such as carboxylic acid modification, and cationic modifications such as amine modification. The above other functional groups may comprise one single species or two or more species.

Preferably, the total amount of the above hydroxyl groups and ester bonds as side chains in the above-mentioned modified polyvinyl alcohol accounts for 80 to 100 mole percent of the total side chain-functional groups in the above-mentioned modified polyvinyl alcohol other than hydrocarbon groups such as methyl and ethyl groups.

The above-mentioned modified polyvinyl alcohol has a number average molecular weight of 1,000 to 1,000,000, preferably 10,000 to 200,000. When it is less than 1,000, the film-forming ability is poor and the hydrophilicity and other physical properties of the coat are also poor. When it exceeds 1,000,000, the resulting modifier for hydrophilicity gives a highly viscous solution, leading to poor workability and poor physical properties of the coat.

The above-mentioned modified polyvinyl alcohol preferably accounts for 0.1 to 30% by mass, more preferably 0.1 to 20% by mass, relative to the above for hydrophilicity of the invention. When this is less than 0.1% by mass, a sufficient level of film-forming ability cannot be obtained and the hydrophilicity and odor preventing ability may possibly to be poor. When it exceeds 30% by mass, aggregation tends to occur in the resulting modifier for hydrophilicity, in some cases leading to inferior workability and poor physical properties of the coat.

The modifier for hydrophilicity of the invention may contain, in combination with the above-mentioned modified polyvinyl alcohol, a polyvinyl alcohol not containing any group represented by the formula (I). Preferably, the above polyvinyl alcohol not containing any group represented by the formula (I) accounts for 0.1 to 30% by mass relative to the above modifier for hydrophilicity. When the content is less than 0.1% by mass, the occurrence of the above polyvinyl alcohol not containing any group represented by the formula (I) may fail to produce an improvement in odor preventing ability in some cases. When it exceeds 30% by mass, aggregation tends to occur in the resulting modifier for hydrophilicity, in some cases leading to inferior workability and poor physical properties of the coat.

Preferably, the modifier for hydrophilicity of the invention further contains a hydrophilic organic compound other than the above-mentioned modified polyvinyl alcohol or the above-mentioned polyvinyl alcohol not containing any group represented by the formula (I) unless the odor preventing ability is sacrificed. When it contains the above-mentioned other hydrophilic organic compound, the modifier for hydrophilicity of the invention can show further improved hydrophilicity.

The above-mentioned other hydrophilic organic compound has a hydrophilic functional group, and the above hydrophilic functional group includes, for example, hydroxyl, carboxyl, sulfonic, amide, amino and phosphonic groups, an ether bond, an imidazole ring, and a nitrile group. The above ether bond includes an acetal bond. These hydrophilic functional groups may be used singly or in combination. As the above hydrophilic organic compound, there may be mentioned, for example, polyamides such as water-soluble nylon species; polyacrylic acid, polyvinyl sulfonic acid, polystyrenesulfonic acid, polyvinylimidazole, polyvinylpyrrolidone, polyvinylacetamide, polyamines, polyacrylamide, isoprenoid sulfonic acid polymer, polyvinylformamide, polyallylamine, polyethyleneimine, polyamidines, polyglutamic acid, hydoxyethylcellulose, hydroxypropylmethylcellulose, carboxymethylcellulose, polycarbodiimides, water-solublepolyurethanes, water-soluble polyesters, water-soluble phenolic resins, water-soluble epoxy resins and like resins and modifications thereof; chitosan, alginic acid and like hydrophilic low-molecular compounds.

In the above-mentioned other hydrophilic organic compound, the above-mentioned ether bond may be a polyoxyalkylene chain. When the modifier contains a polyoxyalkylene chain-containing other hydrophilic organic compound, the resulting hydrophilic coat can exhibit more improved hydrophilicity while retaining substantially the same level of odor preventing ability as attainable without addition thereof. The polyoxyalkylene chain-containing other hydrophilic organic compound is not particularly restricted but includes, among others, polyethylene oxide, polypropylene oxide, nonionic surfactants, reactive alkylene oxide-based surfactants, ethylene oxide-polypropylene oxide block polymers, ethylene oxide-methylene oxide block polymers, ethylene oxide-derived moiety-containing acrylic resins, ethylene oxide-derived moiety-containing polyester resins, and ethylene oxide-derived moiety-containing polyurethane resins.

When contained in the modifier, the above-mentioned other hydrophilic organic compound preferably accounts for less than 50% by mass relative to the resin solid matter in the above modifier for hydrophilicity. When the content exceeds 50% by mass, an odorant adhering to the above other hydrophilic organic compound may emanate an unpleasant odor and, at the same time, the incorporated proportion of the above-mentioned modified polyvinyl alcohol becomes too low and the modifier as a whole may become inferior in odor preventing ability. A content less than 30% by mass is preferred.

The modifier for hydrophilicity of the invention preferably contains, in combination with the above-mentioned modified polyvinyl alcohol, at least one member selected from the group consisting of phosphorus compound salts and boron compound salts of Ca, Al, Mg, Fe and Zn. When it contains the above phosphorus compound salt and/or boron compound salt, which is itself does not emanate any odor, the modifier for hydrophilicity of the invention shows an improved odor preventing ability, retains the hydrophilicity, and shows an improved film-forming ability.

The phosphorus compound salt mentioned above is not particularly restricted but preferably is a salt of an acid constituted of a phosphorus atom(s) and oxygen atoms, such as an oxo acid of phosphorus, including, for example, phosphoric acid salts, phosphorous (phosphonic) acid salts, hypophosphorous (phosphinic) acid salts, phytic acid salts, and condensed phosphoric acid salts. The above condensed phosphoric acid salts are not particularly restricted but include, for example, metaphosphoric acid salts; and salts of polyphosphoric acids such as pyrophosphoric acid and tri-polyphosphoric acid. The above-mentioned phosphorus compound salt is preferably one hardly soluble in water, more preferably one having solubility in water (20° C.) of not more than 1.0 g/100 cm$^3$.

The above-mentioned boron compound salt is not particularly restricted but includes, for example, boric acid salts and borofluorate salts.

The above phosphorus compound salt and boron compound salt preferably have a mean particle diameter of 0.01 to 5 μm.

The above phosphorus compound salt and/or boron compound salt preferably accounts for 0.1 to 200% by mass, preferably 5% to 50% by mass, relative to the resin solid matter in the modifier for hydrophilicity of the invention. When it is less than 0.1% by mass, the odor preventing ability and film-forming ability may not be enhanced by the addition of the above phosphorus compound salt and/or boron compound salt. When it exceeds 200% by mass, the phosphorus compound salt and/or boron compound salt itself may emanate an odor or physical properties of the coat may possibly deteriorate.

Preferably, the modifier for hydrophilicity of the invention further contains at least one member selected from the group consisting of inorganic crosslinking agents, organic crosslinking agents and coupling agents. When it contains the above crosslinking agent and/or coupling agent, the modifier for hydrophilicity of the invention can give hydrophilic coats resistant to deterioration, for example erosion, even when they are exposed to water drops or running water; thus, the hydrophilicity and/or film-forming ability can be further improved.

The above inorganic crosslinking agent is not particularly restricted. Preferred are, however, metal compounds capable of forming complexes with the above-mentioned modified polyvinyl alcohol, for example metal compounds containing zirconium, titanium, chromium, aluminum or zinc. Silica may also be used as the above inorganic crosslinking agent. The organic crosslinking agent or coupling agent mentioned above is not particularly restricted but includes those containing a functional group capable of reacting with the hydroxyl group or with the modified functional group, for example blocked isocyanates, phenolic resins, melamine, silane coupling agents, titanium coupling agents, epoxy compounds, carbodiimides, thiol compounds, silane compounds, amino resins, carboxylic acids and anhydrides thereof, amines, aziridine compounds and like organic compounds.

The above inorganic crosslinking agent, organic crosslinking agent and/or coupling agent preferably accounts for 0.01 to 20% by mass relative to the resin solid matter in the modifier for hydrophilicity of the invention. When it is less than 0.01% by mass, the hydrophilicity or film-forming ability may not be enhanced by the addition of such crosslinking agent and/or coupling agent. When it exceeds 20% by mass, the odor of such crosslinking agent and/or coupling agent itself may become significant, or may adsorb odorants to emanate an unpleasant odor, or may impair the hydrophilicity.

The modifier for hydrophilicity of the invention may further contain particles having a mean particle diameter of 0.01 to 5 μm. In the present specification, the above-mentioned particles having a mean particle diameter of 0.01 to 5 μm are other than the above-mentioned other hydrophilic organic compound, phosphorus compound salts and/or boron compound salts, crosslinking agents and coupling agents. When it contains the above particles, the modifier for hydrophilicity of the invention can make uneven the surface of the coat obtained upon treatment with the above modifier for hydrophilicity and can improve the hydrophilicity through this unevenness.

The above particles may be of an organic compound or an inorganic compound. As the organic compound, there may be mentioned, for example, acrylic, silicone, melamine and cellulosic polymers in minute particle form; titanium oxide, aluminum oxide, zirconium oxide, glass beads and silica may be mentioned as example of the inorganic compound.

When a mean particle diameter of the above particle is smaller than 0.01 μm, it is difficult to obtain an uneven surface profile sufficient to improve the hydrophilicity of the hydrophilic coat surface. When it exceeds 5 μm, the unevenness of the above coat surface becomes excessive, so that retention of condensate water may occur on the coat surface or the coat may become poor in appearance in some cases. A mean particle diameter of 0.1 to 2 μm is preferred.

The above particles preferably account for less than 50% by mass relative to the resin solid matter in the modifier for hydrophilicity of the invention. When it is not less than 50% by mass, the above particles themselves may emanate an odor and/or an odorant(s) adsorbed thereon may emanate an unpleasant odor. Preferably, it is lower than 30% by mass.

The modifier for hydrophilicity of the invention may further contain a dispersant so that the above-mentioned modified polyvinyl alcohol may be dispersed uniformly. The above dispersant is not particularly restricted but includes, for example, high-molecular polycarboxylic acid alkylolamine salts, acrylic copolymers, polycarboxylic acid amide solutions, aliphatic polybasic carboxylic acids, and high-molecular acid polyester salts. Various surfactants may also be added for attaining dispersion.

Any of various antimicrobial agents may be added to the modifier for hydrophilicity of the invention.

Usable as the above antimicrobial agents are, for example, zinc pyrithione, 2-(4-thiazolyl)-benzimidazole, 1,2-benzisothiazoline, 2-n-octyl-4-isothiazolin-3-one, N-(fluorodichloromethylthio)phthalimide, N,N-dimethyl-N'-phenyl-N'-(fluorodichloromethylthio)sulfamide, methyl 2-benzimidazolecarbamate, bis(dimethylthiocarbamoyl)disulfide, N-(trichloromethylthio)-4-cyclohexane-1,2-dicarboximide, barium metaborate, allyl isothiocyanate; polyoxyalkylenetrialkylammonium salts, organosilicon quaternary ammonium salts, hexamethylenebiguanide hydrochloride, and like quaternary ammonium salts; tri-n-butylteradecylphosphonium chloride and like quaternary phosphonium salts; polyphenolic antimicrobial agents, phenylamide antimicrobial agents, and biguanide antimicrobial agents.

Various additives other than those mentioned above may be incorporated in the modifier for hydrophilicity of the invention according to need. As the above additives, there may be mentioned lubricants, antimicrobial agents, antifungal agents, preservatives, antibacterial agents, surfactants, pigments, dyes, and inhibitors for providing corrosion resistance, etc.

The modifier for hydrophilicity of the invention can be prepared in the conventional manner. For example, there can be used the method which comprises effecting dissolution or dispersion of the above-mentioned modified polyvinyl alcohol, if desired together with the polyvinyl alcohol not containing any group represented by the above formula (I), and/or the other hydrophilic organic compound, in the whole modifier, adding the optional component(s), such as the phosphorus compound salt and/or boron compound salt, particles having a mean particle diameter of 0.01 to 5 μm, crosslinking agent, coupling agent, and other additives, and, if necessary, performing forced dispersion using an ultrasonic dispersion mixer, a dispersion mixer using a micro medium or the like.

The present invention provides a hydrophilic modification method comprising a step of forming a coat having a solid coat amount of 0.02 to 3 g/m$^2$ on a substrate material made of aluminum or an aluminum alloy with a modifier for hydrophilicity after treatment for rust prevention thereof.

Generally, the above substrate material is subjected in advance to degreasing treatment by cleaning with an acidic or alkaline cleaning agent.

The above acidic cleaning agent is not particularly restricted but includes, for example, acidic aqueous solutions such as those of nitric acid, sulfuric acid and hydrofluoric acid or a combination of these. The acid concentration of the above acidic cleaning agent is preferably 1 to 10 N, more preferably 3 to 6 N. It is also preferable to supplement the above acidic cleaning agent with a salt or acid salt of a metal selected from among iron, nickel, cobalt, molybdenum and cerium.

The above alkaline cleaning agent is not particularly restricted but includes, for example, alkaline aqueous solutions containing at least one of sodium hydroxide, sodium silicate and sodium phosphate. A surfactant may be added to the above alkaline aqueous solutions to thereby increase the detergency thereof.

The method of cleaning the above substrate material is not particularly restricted but may comprise, for example, spraying the substrate material with the above cleaning agent or immersing the substrate material in a bath containing the above cleaning agent. The liquid temperature of the above cleaning agent is preferably 10 to 70° C., and the time of contact with the above cleaning agent is preferably 1 second to 5 minutes. When the liquid temperature is below 10° C. or the above time of contact is shorter than 1 second, the etching may be insufficient and, a temperature exceeding 70° C. or a time exceeding 5 minutes may be unfavorable from the economical viewpoint. The substrate material cleaned in the above manner is washed with water and then subjected to treatment for rust prevention.

The above treatment for rust prevention is carried out in the manner of chemical conversion treatment using a chemical conversion agent. Usable as the above chemical conversion agent are the conventional chromatic chromating agent, phosphoric chromating agent and nonchromic treatment agent.

The above chromatic chromating agent is an aqueous solution containing chromic acid, a fluoride and a strong acid, and includes a reactive chromate and electrolytic chromate whose main component is trivalent chromium, and a coating type chromate in which hexavalent and trivalent chromium are admixed. The above phosphoric chromating agent is a mixed aqueous solution containing chromic acid, orthophosphoric acid and a fluoride. In carrying out chemical conversion treatment with the above chromating agent, it is necessary to control the amounts of the hexavalent chromium ion, phosphate ion and fluoride ion, respectively.

The above nonchromic treatment agent includes a reactive treatment agent and a coating type treatment agent. The above reactive treatment agent includes zirconium salts, titanium salts, silicon salts, boron salts and permanganate salts. Also preferred are fluorides of these salts. The above coating type treatment agent includes, for example, coating type nonchromic treatment agents in which a zirconium salt is admixed with a water-soluble resin. Preferably, at least one member selected from the group consisting of manganese, vanadium, tungsten, molybdenum, titanium and aluminum and compounds containing these atoms, such as manganic acid, permanganic acid, vanadic acid, tungstic acid and molybdic acid, silica, phosphoric acid and phosphate salts is added to the above nonchromic treatment agent where necessary.

The method of chemical conversion treatment of the above substrate material is not particularly restricted but includes, for example, the dipping method and spraying method. In cases where the above substrate material has a complicated profile, such a car evaporator, the dipping method is preferred. In the above chemical conversion treatment, the treatment temperature is preferably at ordinary temperature or a slightly elevated temperature, more preferably at 10 to 70° C., and the treatment time is preferably 1 second to 5 minutes.

As the above-mentioned treatment for rust prevention, a resin primer of the epoxy, urethane or acrylic type may be applied on the substrate.

The chemical conversion coat obtained by the above chemical conversion treatment preferably has a solid coat amount of 10 to 300 mg/m$^2$, based on such elements as Cr, Zr or Ti adhered. When the amount is less than 10 mg/m$^2$, the rust prevention property may be insufficient. When the amount exceeds 300 mg/m$^2$, it is economically disadvantageous and, in addition, may lead to a decrease in hydrophilicity as a result of reaction with the hydrophilic coat. After the above chemical conversion treatment, the substrate is washed with water, if necessary, and then subjected to hydrophilic modification using the above modifier for hydrophilicity.

The above hydrophilic modification method is not particularly restricted but includes, for example, the dipping method and coating method. In cases where the substrate material has a complicated profile, such a car evaporator, the dipping method is preferred. In cases where the substrate material is a fin material, the coating method is preferred. When the dipping method is employed in the above hydrophilic modification, the treatment liquid temperature is preferably about 10 to 60° C., and the treatment time is preferably about 3 seconds to about 5 minutes. A coat having a solid coat amount of 0.02 to 3 g/m$^2$ is formed by the above hydrophilic modification. When it is less than 0.02 g/m$^2$, the hydrophilic properties will not be produced. When it exceeds 3 g/m$^2$, the productivity will decrease. It is preferably 0.05 to 3 g/m$^2$, more preferably 0.1 to 1 g/m$^2$.

After the above hydrophilic modification, baking is carried out, in the cases where the above substrate material is a molding matter at 100 to 220° C. for 10 to 60 minutes, and in the cases where the above substrate material is a fin material at 100 to 330° C. for 3 to 40 minutes, whereby a hydrophilic coat can be obtained. At a baking temperature below the infimum, unsatisfactory film-forming ability may result and, at above maximum, the durability of hydrophilicity will decrease. The baking temperature is preferably 120 to 200° C. in the cases where the above substrate material is a molding matter and preferably 180 to 280° C. in the cases where the above substrate material is a fin material.

The modifier for hydrophilicity of the invention comprises a modified polyvinyl alcohol containing a group represented by the formula (I) on a side chain thereof, accounting for 0.01 to 20 mole percent of the sum of hydroxyl groups and acetoxy groups in the molecule, and as a consequence, the hydrophilic coat obtained from the above modifier for hydrophilicity shows very good hydrophilicity and, in addition, as the intrinsic properties of the coat, not only emanation of a dusty or like unpleasant odor but also emanation of the unpleasant odor of the odorant after exposure thereto, are attenuated. The mechanisms by which the hydrophilic modification method of the present invention produces such advantageous effects are not fully clear but may be as follows.

Thus, the above-mentioned modified polyvinyl alcohol shows a high level of hydrophilicity owing to the hydroxyl groups and groups represented by the above formula (I) contained therein, whereas it is low in affinity for odorants, high in crystallinity and high in density, so that even if an odorant is adhered to the oxygen atoms of the hydroxyl groups or of the groups represented by the above formula (I), it is presumably not accumulated but is released, hence the unpleasant odor of the above odorant will not be emanated.

Therefore, the modifier for hydrophilicity of the present invention and the hydrophilic modification method using the above modifier for hydrophilicity are suitably used for aluminum or aluminum alloy materials, and more suitably used for, in particular, evaporators such as car evaporators, heat exchangers, car fins, room air conditioners and the like.

The hydrophilic modification method of the present invention which has the constitution mentioned above, will not emanate the dusty odor which is intrinsic in some component(s) in the modifier for hydrophilicity or the unpleasant odor of an odorant(s) adsorbed thereon. Thus, even during a long period of use, the odor of the hydrophilic coat itself as obtained can be suppressed and unpleasant odor emanation after exposure to odorants can be suppressed, while the hydrophilicity can be retained. Therefore, the modifier for hydrophilicity, the hydrophilic modification method and aluminum or aluminum alloy materials treated by the hydrophilic modification method are suitably used for evaporators, heat exchangers, car fins, room air conditioners and so forth.

EXAMPLES

The following Examples and Comparative Examples further illustrate the present invention. These Examples are, however, by no means limitative of the scope of the present invention. In each table, each concentration data indicates the concentration (in % by mass) in the modifier for hydrophilicity.

Examples 1 to 22

Preparation of Modifiers for Hydrophilicity

According to the formulations shown in Table 1, modifiers for hydrophilicity having the respective concentrations (in % by mass) given in Table 1 were prepared by blending a modified polyvinyl alcohol powder, a phosphorous compound salt, boron compound salt, other hydrophilic organic compound, a crosslinking agent and so forth. Used as the polyvinyl alcohol not containing any group relative to the above formula (I) was PVA-1 [degree of saponification 99%; number average molecular weight 50,000]. Used as the modified polyvinyl alcohol were PVA-2, PVA-3 and PVA-4 [n in the above formula (I) being 10, 10 and 20, respectively; the group represented by the above formula (I) accounting for 5 mole percent, 1 mole percent and 1 mole percent, respectively, relative to the hydroxyl and acetoxy groups in the molecule; the degree of saponification being 99% and the number average molecular weight being 50,000 in each case]. Used as a carboxylic acid-modified polyvinyl alcohol was PVA-5 [with 5 moles relative to 100 moles of the sum of the hydroxyl and acetoxy groups in the molecule being modified with acrylic acid; n in the above formula (I) being 10; the group represented by the above formula (I) accounting for 5 mole percent relative to the hydroxyl and acetoxy groups in the molecule; the degree of saponification being 99%; the number average molecular weight being 50,000], and as a carbonyl-modified polyvinyl alcohol was PVA-6 [with 1 moles relative to 100 moles of the sum of the hydroxyl and acetoxy groups in the molecule being modified with acrylic acid; n in the above formula (I) being 10; the group represented by the above formula (I) accounting for 5 mole percent relative to the hydroxyl and acetoxy groups in the molecule; the degree of saponification being 99%; the number average molecular weight being 50,000]. Furthermore, a dispersant [polycarboxylic acid amide solution], a crosslinking phenol [novolak phenol resin, number average molecular weight about 1,000], a polyisocyanate [self-emulsifiable aqueous blocked isocyanate], an acrylic resin [copolymer of methoxypolyoxyethylene methacrylate and acrylic acid (8:2)], polyethylene oxide [PEO, number average molecular weight 100,000], polyacrylamide [homopolymer, number average molecular weight 20,000], polyvinyl sulfonic acid [homopolymer, number average molecular weight 20,000], resin particles [methyl methacrylate resin particles, mean particle diameter 1 μm], an antimicrobial agent [2-(4-thiazolyl)benzimidazole] and so forth were used.

Hydrophilic Treatment

An aluminum alloy-made car evaporator was immersed in a bath containing an acidic cleaning solution containing 10% by mass (1.6 N) of nitric acid and 5% by mass (1.0 N) of sulfuric acid and warmed to 65° C. for 4 minutes, then drawn up, and thoroughly washed with tap water. Further, this car evaporator was immersed in a bath containing a zirconium-containing rust preventing agent (Alsurf 440N, 2%, product of Nippon Paint) warmed to 50° C. for 90 seconds for chemical conversion treatment, and then thoroughly washed with tap water. Then, this car evaporator was immersed in a bath containing one of the modifiers for hydrophilicity obtained in the above manner at 20° C. for 1 minute, then drawn up, and heated to 140° C. (temperature arrived at) for 30 minutes to give a hydrophilic modification product with a solid coat amount of 0.3 g/m$^2$.

Evaluation

The hydrophilic modification products obtained in the above manner were evaluated for hydrophilicity and odor by the following methods. The results are shown in Table 1.

1. Hydrophilicity Evaluation (1)

Hydrophilic modification products were brought into contact with running tap water for 72 hours and then measured for contact angle with water drops. A smaller contact angle can be said to be indicative of a higher level of hydrophilicity.

2. Hydrophilicity Evaluation (2)

Test pieces modified for hydrophilicity as mentioned above were brought into contact with running water for 8 hours, then placed in a mixture of 5 grams each of dioctyl phthalate, hexadecanol and stearic acid placed as contaminants in a dish, and the test pieces in the dish were dried at 80° C. for 16 hours (some of the contaminants evaporated). This procedure of contacting with running water and drying was taken as one cycle. After 5 cycles, each test piece was measured for contact angle to thereby evaluate the deterioration in hydrophilicity as a result of contamination in the atmospheric environment.

3. Dusty Odor Evaluation

Hydrophilic modification products were brought into contact with running tap water for 72 hours and then smelled for evaluation on the following scoring scale:

| | |
|---|---|
| 0 point | No odor; |
| 1 point | An odor is smelled just faintly; |
| 2 points | An odor is smelled rather readily; |
| 3 points | An odor is smelled clearly; |
| 4 points | A strong odor is smelled; |
| 5 points | A very strong odor is smelled. |

4. Adhering Odor (1)

The hydrophilic modification product was brought into contact with running tap water for 72 hours and then placed in a meeting room (50 m$^3$) where the product was exposed to the smoke from 20 cigarettes for 3 hours. Then, it was allowed to stand in another smoke-free meeting room (50 m$^3$) for 1 hour and, thereafter, subjected to sensory evaluation on the scale of 0 to 5 as mentioned above under 3.

5. Adhering Odor (2)

The hydrophilic modification product was brought into contact with running tap water for 72 hours and then placed in a meeting room (50 m$^3$) where the product was exposed to the odor from 100 ml each of four commercially available perfumes, namely CKone (Calvin Klein), Ptisenbon (Givenchy), True Love (Elizabeth Arden) and Tendre Poison (Christian Dior). Then, it was allowed to stand in another odor-free meeting room (50 m$^3$) for 1 hour, and subjected to sensory evaluation on the scale of 0 to 5 as mentioned above under 3.

TABLE 1

| | Modifier for hydrophilicity | | | | Hydrophilicity | | Odor | | |
|---|---|---|---|---|---|---|---|---|---|
| | (concentration in a modifier for hydrophilicity; % by mass) | | | | | | Dusty | Adhering | Adhering |
| | PVA | Metal compound | Crosslinking agent | Additive | 1 | 2 | odor 1 | odor 1 | odor 2 |
| Ex.1 | PVA-2(2.0) | — | — | — | 28 | 35 | 1.5 | 1.8 | 1.8 |
| Ex.2 | PVA-3(2.0) | — | — | — | 25 | 35 | 1.5 | 1.8 | 1.8 |
| Ex.3 | PVA-4(2.0) | — | — | — | 28 | 35 | 1.5 | 1.8 | 1.8 |
| Ex.4 | PVA-1(1.0) PVA-2(1.0) | — | — | — | 25 | 35 | 1.5 | 1.8 | 1.8 |
| Ex.5 | PVA-2(2.0) | Ca phosphate(0.5) | — | — | 25 | 35 | 1.5 | 1.8 | 1.8 |
| Ex.6 | PVA-2(2.0) | Fe phosphate(0.5) | — | — | 25 | 35 | 1.5 | 1.8 | 2 |
| Ex.7 | PVA-2(2.0) | Al tripolyphosphate | — | — | 25 | 35 | 1.5 | 1.8 | 1.8 |
| Ex.8 | PVA-2(2.0) | Mg borate | — | — | 25 | 33 | 1.5 | 1.8 | 1.8 |
| Ex.9 | PVA-2(2.0) | Zinc pyrophosphate | — | — | 25 | 35 | 1.5 | 1.8 | 1.8 |
| Ex.10 | PVA-2(2.0) | Ca phosphate(0.5) Dispersant(0.2) | — | — | 23 | 33 | 1.5 | 1.8 | 1.8 |
| Ex.11 | PVA-2(2.0) | Ca phosphate(0.5) | Crosslinking phenol(0.2) | — | 28 | 35 | 1 | 1.8 | 1.8 |
| Ex.12 | PVA-5(2.0) | Ca phosphate(0.5) | Silane coupling agent (0.2) | — | 25 | 30 | 1.5 | 2 | 2 |
| Ex.13 | PVA-6(2.0) | Ca phosphate(0.5) | Carbodihydrazide (0.2) | — | 25 | 33 | 1.5 | 1.8 | 2 |
| Ex.14 | PVA-2(2.0) | — | Zircon antimony fluoride (0.2) | — | 23 | 35 | 1.5 | 2 | 2 |
| Ex.15 | PVA-1(1.0) PVA-2(1.0) | Ca phosphate(0.5) | Polyisocyanate (0.2) | — | 25 | 35 | 1 | 1.8 | 1.8 |
| Ex.16 | PVA-2(2.0) | Ca phosphate(0.5) | — | Acrylic resin (0.5) | 20 | 33 | 1 | 1.8 | 1.8 |
| Ex.17 | PVA-2(2.0) | — | — | Acrylic resin (0.5) | 20 | 35 | 1 | 2 | 2 |
| Ex.18 | PVA-2(2.0) | Ca phosphate(0.5) | — | PEO (0.5) | 23 | 35 | 1.5 | 1.8 | 2 |
| Ex.19 | PVA-2(2.0) | Ca phosphate(0.5) | — | Polyacrylamide (0.5) | 23 | 33 | 1.5 | 2 | 2 |
| Ex.20 | PVA-2(2.0) | Ca phosphate(0.5) | — | Na polyvinylsulfonate (0.5) | 23 | 35 | 1.5 | 2 | 2 |
| Ex.21 | PVA-2(2.0) | Ca phosphate(0.5) | — | Resin particles (0.5) | 25 | 33 | 1.5 | 1.8 | 2 |
| Ex.22 | PVA-2(2.0) | Ca phosphate(0.5) | — | Antimicrobial agent (0.2) | 25 | 35 | 1.5 | 1.8 | 1.8 |

Comparative Examples 1 to 4

Hydrophilic modification products were obtained and evaluated in the same manner as in Example 1 except that modifiers for hydrophilicity respectively having the compositions shown in Table 2 are used. Used in the modifiers for hydrophilicity were polyacrylic acid (homopolymer, number average molecular weight 100,000), colloidal silica [aqueous dispersion of $SiO_2$, mean particle diameter 0.3 μm], carboxymethylcellulose [number average molecular weight 20,000], polyvinylsulfonic acid [homopolymer, number average molecular weight 20,000], polyacrylamide [homopolymer, number average molecular weight 20,000], polyvinylpyrrolidone [homopolymer, number average molecular weight 20,000], and polyethylene oxide [PEO, number average molecular weight 100,000]. The evaluation results are shown in Table 2.

Examples within the scope of the present invention were superior in hydrophilicity and odor preventing ability.

Examples 23 to 38

Substrates were treated with an alkaline cleaning agent [Surf cleaner 340, 1%, product of Nippon Paint] at 65° C. for 5 seconds and then subjected to chemical conversion treatment with a chromium phosphate-based rust preventing agent [Alsurf 407/47, 3%/0.5%, products of Nippon Paint] at 50° C. for 5 seconds. Then, the modifiers for hydrophilicity having the respective compositions shown in Table 3 in which the described components were among the components used in the modifiers for hydrophilicity of Examples 1 to 22 were applied to the substrates using a bar coater. The coats were then baked at 220° C. for 20 seconds to give hydrophilic modified products, the solid coat amount being adjusted to 0.3 g/m². The hydrophilic treatment products obtained were evaluated in the same manner as in Example 1. The evaluation results are shown in Table 3.

TABLE 2

| | Modifier for hydrophilicity (concentration in a modifier for hydrophilicity; % by mass) | Hydrophilicity 1 | Hydrophilicity 2 | Dusty odor 1 | Odor Adhering odor 1 | Adhering odor 2 |
|---|---|---|---|---|---|---|
| Compar. Ex.1 | Polyacrylic acid (1.0) Colloidal silica (2.0) | 20 | 35 | 3 | 3 | 3 |
| Compar. Ex.2 | Carboxymethylcellulose (1.0) Polyacrylic acid (1.0) Zircon antimony fluoride (0.2) | 25 | 50 | 2 | 3 | 2.5 |
| Compar. Ex.3 | Polyvinylsulfonic acid (1.0) Polyacrylamide (1.0) Zircon antimony fluoride (0.2) | 20 | 35 | 1.5 | 3 | 2.5 |
| Compar. Ex.4 | Polyvinylpyrrolidone (1.0) PEO (1.0) Polyacrylic acid (1.0) Ca phosphate (0.2) | 25 | 40 | 1.5 | 2.5 | 3 |

From Table 1 and Table 2, it was clear that while the hydrophilic modification products obtained in Comparative Examples which were outside the scope of the present invention were poor in hydrophilicity and/or odor preventing ability, the hydrophilic modification products obtained in

TABLE 3

| | Modifier for hydrophilicity (concentration in a modifier for hydrophilicity; % by mass) | | | | Hydrophilicity | | Odor | | |
|---|---|---|---|---|---|---|---|---|---|
| | PVA | Metal compound | Crosslinking agent | Additive | 1 | 2 | Dusty odor 1 | Adhering odor 1 | Adhering odor 2 |
| Ex.23 | PVA-2(2.0) | — | — | — | 23 | 33 | 1.5 | 1.8 | 1.8 |
| Ex.24 | PVA-3(2.0) | — | — | — | 23 | 33 | 1.5 | 1.8 | 1.8 |
| Ex.25 | PVA-1(1.0) PVA-2(1.0) | — | — | — | 23 | 35 | 1.5 | 1.8 | 1.8 |
| Ex.26 | PVA-2(2.0) | Ca phosphate(0.5) | — | — | 23 | 33 | 1.5 | 1.8 | 1.8 |
| Ex.27 | PVA-2(2.0) | Al tripolyphosphate | — | — | 25 | 33 | 1.5 | 1.8 | 1.8 |
| Ex.28 | PVA-2(2.0) | Zinc pyrophosphate | — | — | 25 | 35 | 1.5 | 1.8 | 1.8 |
| Ex.29 | PVA-2(2.0) | Ca phosphate(0.5) Dispersant(0.2) | — | — | 23 | 33 | 1.5 | 1.8 | 1.8 |
| Ex.30 | PVA-2(2.0) | Ca phosphate(0.5) | Crosslinking phenol(0.2) | — | 25 | 35 | 1 | 1.8 | 1.8 |
| Ex.31 | PVA-6(2.0) | Ca phosphate(0.5) | Carbodihydrazide (0.2) | — | 20 | 35 | 1.5 | 2 | 1.8 |
| Ex.32 | PVA-2(2.0) | — | Zircon antimony fluoride (0.2) | — | 23 | 33 | 1.5 | 2 | 1.8 |
| Ex.33 | PVA-2(2.0) | Ca phosphate(0.5) | — | Acrylic resin (0.5) | 20 | 33 | 1 | 1.8 | 1.8 |
| Ex.34 | PVA-2(2.0) | — | — | Acrylic resin (0.5) | 20 | 30 | 1 | 2 | 2 |
| Ex.35 | PVA-2(2.0) | Ca phosphate(0.5) | — | PEO (0.5) | 23 | 33 | 1.5 | 2 | 1.8 |
| Ex.36 | PVA-2(2.0) | Ca phosphate(0.5) | — | Polyacrylamide (0.5) | 20 | 33 | 1.5 | 2 | 1.8 |
| Ex.37 | PVA-2(2.0) | Ca phosphate(0.5) | — | Na polyvinylsulfonate (0.5) | 22 | 33 | 1.5 | 2 | 2 |
| Ex.38 | PVA-2(2.0) | Ca phosphate(0.5) | — | Resin particles (0.5) | 20 | 30 | 1.5 | 2 | 1.8 |

From Table 1 and Table 3, it is clear that, in Examples 23 to 38, where degreasing treatment, treatment for rust prevention and baking conditions were changed, the hydrophilicity was, sometimes the same, improved in most cases as compared with Examples 1 to 22, although the odor preventing ability remained almost the same.

The invention claimed is:

1. A modifier for hydrophilicity which comprises a modified polyvinyl alcohol, with the degree of saponification of not less than 90%, containing a group represented by the formula (I) on a side chain thereof;

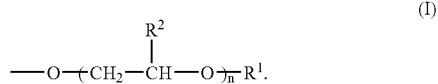
(I)

in the formula, n represents an integer of 1 to 500, $R^1$ represents a hydrogen atom or an alkyl group containing 1 to 4 carbon atoms, and $R^2$ represents a hydrogen atom or a methyl group, said group represented by the above formula (I) accounting for 0.1 to 10 mole percent of the sum of hydroxyl groups and acetoxy groups in said modified polyvinyl alcohol, and said modified polyvinyl alcohol accounting for 0.1 to 30% by mass relative to said modifier for hydrophilicity, and said modifier for hydrophilicity further comprises a polyvinyl alcohol not containing any group represented by the formula (I) in an amount of 0.1 to 30% by mass relative to said modifier for hydrophilicity.

2. The modifier for hydrophilicity according to claim 1, which further comprises at least one member selected from the group consisting of phosphorus compound salts and boron compound salts of Ca, Al, Mg, Fe and Zn in an amount of 0.1 to 200% by mass relative to a resin solid matter.

3. The modifier for hydrophilicity according to claim 2, which further comprises at least one member selected from the group consisting of inorganic crosslinking agents and organic crosslinking agents.

4. The modifier for hydrophilicity according to claim 3, wherein the inorganic crosslinking agents are selected from the group consisting of zirconium compounds, titanium compounds, chromium compounds, aluminum compounds, zinc compounds, and silica, and the organic crosslinking agents are selected from the group consisting of blocked isocyanates, phenolic resins, melamine, silane coupling agents, titanium coupling agents, epoxy compounds, carbodiimides, thiol compounds, silane compounds, amino resins, carboxylic acids, carboxylic anhydrides, amines, and aziridine compounds.

5. The modifier for hydrophilicity according to claim 2, which further comprises particles of an organic compound or an inorganic compound, in an amount of less than 50% by mass relative to the resin solid matter, said particles having a mean particle diameter of 0.01 to 5 μm and said organic compound and said inorganic compound crosslinking agents, and coupling agents.

6. The modifier for hydrophilicity according to claim 2, which further comprises less than 50% by mass, relative to the resin solid matter, of particles of an organic compound or an inorganic compound having a mean particle diameter of 0.01 to 5 μm, said organic compound being at least one member selected from the group consisting of acrylic, silicone, melamine and cellulosic polymers, and said inorganic compound being at least one member selected from the group consisting of titanium oxide, aluminum oxide, zirconium oxide, glass beads and silica.

7. The modifier for hydrophilicity according to claim 1, which further comprises at least one member selected from the group consisting of inorganic crosslinking agents, and organic crosslinking agents.

8. The modifier for hydrophilicity according to claim 7, which further comprises particles of an organic compound or an inorganic compound, in an amount of less than 50% by mass relative to the resin solid matter, said particles having a mean particle diameter of 0.01 to 5 μm and said organic compound and said inorganic compound excluding a hydrophilic organic compound, phosphorus compound salts boron compound salts, and crosslinking agents.

9. The modifier for hydrophilicity according to claim 7, which comprises less than 50% by mass, relative to the resin solid matter, of particles of an organic compound or an inorganic compound having a mean particle diameter of 0.01 to 5 μm, said organic compound being at least one member selected from the group consisting of acrylic, silicone, melamine and cellulosic polymers, said inorganic compound being at least one member selected from the group consisting of titanium oxide, aluminum oxide, zirconium oxide, glass beads and silica.

10. The modifier for hydrophilicity according to claim 7, wherein the inorganic crosslinking agents are selected from the group consisting of zirconium compounds, titanium compounds, chromium compounds, aluminum compounds, zinc compounds, and silica, and the organic crosslinking agents are selected from the group consisting of blocked isocyanates, phenolic resins, melamine, silane coupling agents, titanium coupling agents, epoxy compounds, carbodiimides, thiol compounds, silane compounds, amino resins, carboxylic acids, carboxylic anhydrides, amines, and aziridine compounds.

11. The modifier for hydrophilicity according to claim 1, which further comprises particles of an organic compound or an inorganic compound, in an amount of less than 50% by mass relative to the resin solid matter, said particles having a mean particle diameter of 0.01 to 5 μm and said organic compound and said inorganic compound excluding a hydrophilic organic compound, phosphorus compound salts, boron compound salts, and crosslinking agents.

12. The modifier for hydrophilicity according to claim 1, which further comprises less than 50% by mass, relative to the resin solid matter, of a hydrophilic organic compound having at least one member selected from the group consisting of hydroxyl, carboxyl, sulfo, amido, amino, phosphonic and nitrile groups and an ether bond.

13. The modifier for hydrophilicity according to claim 12, wherein the hydrophilic organic compound has a polyoxyethylene chain.

14. The modifier for hydrophilicity according to claim 1, which further comprises less than 50% by mass, relative to the resin solid matter, of particles of an organic compound or an inorganic compound having a mean particle diameter of 0.01 to 5 μm, said organic compound being at least one member selected from the group consisting of acrylic, silicone, melamine and cellulosic polymers, and said inorganic compound being at least one member selected from the group consisting of titanium oxide, aluminum oxide, zirconium oxide, glass beads and silica.

* * * * *